United States Patent
Li et al.

(10) Patent No.: US 11,907,456 B2
(45) Date of Patent: Feb. 20, 2024

(54) TOUCH SUBSTRATE, DISPLAY PANEL, AND TOUCH DISPLAY DEVICE

(71) Applicants: Chengdu BOE Optoelectronics Technology Co., Ltd., Sichuan (CN); BOE Technology Group Co., Ltd., Beijing (CN)

(72) Inventors: Meng Li, Beijing (CN); Chao Zeng, Beijing (CN); Weiyun Huang, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/917,990

(22) PCT Filed: Feb. 22, 2021

(86) PCT No.: PCT/CN2021/077300
§ 371 (c)(1),
(2) Date: Oct. 10, 2022

(87) PCT Pub. No.: WO2021/203849
PCT Pub. Date: Oct. 14, 2021

(65) Prior Publication Data
US 2023/0147291 A1    May 11, 2023

(30) Foreign Application Priority Data
Apr. 10, 2020 (CN) .......................... 202010280495.3

(51) Int. Cl.
*G06F 3/041* (2006.01)
*G06F 3/044* (2006.01)

(52) U.S. Cl.
CPC .......... *G06F 3/0412* (2013.01); *G06F 3/0443* (2019.05); *G06F 3/0446* (2019.05);
(Continued)

(58) Field of Classification Search
CPC . G06F 3/044–0448; G06F 2203/04111; G06F 2203/04103; G06F 2203/04112; G06F 2203/04102
See application file for complete search history.

(56) References Cited

U.S. PATENT DOCUMENTS

2013/0207911 A1\* 8/2013 Barton ..................... H01B 5/14
                                                                345/173
2014/0049485 A1    2/2014 Oh et al.
(Continued)

FOREIGN PATENT DOCUMENTS

CN    104106024 A    10/2014
CN    104808879 A    7/2015
(Continued)

OTHER PUBLICATIONS

CN202010280495.3 first office ation.
(Continued)

*Primary Examiner* — Hang Lin
(74) *Attorney, Agent, or Firm* — IPro, PLLC

(57) ABSTRACT

Provided are a touch substrate, a display panel, and a touch display device. The touch substrate, including: a base substrate; a conductive layer on the base substrate, the conductive layer being a single-layer structure, and the conductive layer including a plurality of touch electrodes and a plurality of leads electrically connected with the plurality of touch electrodes; where: a first grid-like structure is formed between adjacent leads, and a first disconnection line is arranged between the adjacent leads in the first grid-like structure; the touch electrodes have a second grid-like
(Continued)

structure, and the second grid-like structure includes a plurality of breakpoints; and a connection line between the plurality of breakpoints has a substantially same shape as the first disconnection line.

20 Claims, 7 Drawing Sheets

(52) U.S. Cl.
CPC ............... *G06F 3/04164* (2019.05); *G06F 2203/04102* (2013.01); *G06F 2203/04112* (2013.01)

(56) References Cited

U.S. PATENT DOCUMENTS

| | | |
|---|---|---|
| 2015/0242029 A1 | 8/2015 | Kim et al. |
| 2017/0060306 A1 | 3/2017 | Barton et al. |
| 2017/0090647 A1 | 3/2017 | Kim et al. |
| 2020/0183538 A1 | 6/2020 | Li et al. |
| 2021/0405823 A1* | 12/2021 | Wu .................. G06F 3/0448 |

FOREIGN PATENT DOCUMENTS

| | | |
|---|---|---|
| CN | 106415462 A | 2/2017 |
| CN | 110764636 A | 2/2020 |
| CN | 110764657 A | 2/2020 |
| CN | 111506218 A | 8/2020 |
| JP | 2016192188 A | 11/2016 |

OTHER PUBLICATIONS

CN202010280495.3 second office action.
CN202010280495.3 Decision of Rejection.
PCT/CN2021/077300 international search report.

* cited by examiner

TOUCH SUBSTRATE, DISPLAY PANEL, AND TOUCH DISPLAY DEVICE

CROSS-REFERENCE OF RELATED APPLICATIONS

The disclosure is a National Stage of International Application No. PCT/CN2021/077300, filed Feb. 22, 2021, which claims the priority from Chinese Patent Application No. 202010280495.3, filed with the China National Intellectual Property Administration on Apr. 10, 2020 and entitled "Touch Substrate, Display Panel and Touch Display Device", which is hereby incorporated by reference in its entirety.

FIELD OF INVENTION

The disclosure relates to the field of display technology, and in particular, to a touch substrate, a display panel, and a touch display device.

BACKGROUND

With the development of science and technology, the smart devices with touch function, such as mobile phones, tablet computers, digital cameras and smart wearable products, simplify the human-computer interaction and bring the high-quality user experience to users. There are mainly four types of touch screens, including: resistive, capacitive, infrared and surface acoustic wave touch screens. The capacitive touch panels are widely used in electronic products due to the advantages of fast response time, good reliability and high durability.

At present, the flexible Organic Light Emitting Diode (OLED) touch display screen usually adopts the On-cell structure. In order to achieve the better bending ability and higher transmittance, the exposure and development process is usually used to fabricate the metal grid-shaped touch electrode. Compared with the traditional plug-in touch screen, the On-cell structure has the advantages of lower thickness and stronger bending resistance.

BRIEF SUMMARY

An embodiment of the disclosure provides a touch substrate, including:
  a base substrate;
  a conductive layer on the base substrate, the conductive layer being a single-layer structure, and the conductive layer comprising a plurality of touch electrodes and a plurality of leads electrically connected with the plurality of touch electrodes; where:
  a first grid-like structure is formed between adjacent leads, and a first disconnection line is arranged between the adjacent leads in the first grid-like structure;
  the touch electrodes have a second grid-like structure, and the second grid-like structure includes a plurality of breakpoints; and
  a connection line between the plurality of breakpoints has a substantially same shape as the first disconnection line.

In some embodiments, the first disconnection line between the adjacent leads in the first grid-like structure is a first fold line, the connection line between the breakpoints in the second grid-like structure is a second fold line, and the first fold line and the second fold line have a substantially same shape.

In some embodiments, the second grid-like structure has a plurality of second fold lines, and a touch electrode between two adjacent second fold lines has a substantially same pattern as a lead between two adjacent first fold lines.

In some embodiments, the second grid-like structure has a plurality of mesh cells, each column of mesh cells have at least one first mesh cell, and each of the at least one first mesh cell has at most one breakpoint; and all first mesh cells are electrically connected, and a connection line between breakpoints of each column of mesh cells is the second fold line.

In some embodiments, the first disconnection line between the adjacent leads in the first grid-like structure is a first straight line, the connection line between the breakpoints in the second grid-like structure is a second straight line, and an extension direction of the first straight line is substantially parallel to an extension direction of the second straight line.

In some embodiments, the second grid-like structure has a plurality of second straight lines, and a touch electrode between two adjacent second straight lines has a substantially same pattern as a lead between two adjacent first straight lines.

In some embodiments, the second grid-like structure has a plurality of mesh cells, each column of mesh cells have at least one first mesh cell, and each of at least one first mesh cell has at most one breakpoint; and all first mesh cells are electrically connected, and a connection line between breakpoints of each column of mesh cells is the second straight line.

In some embodiments, the conductive layer further includes a plurality of dummy leads located at gaps between the leads; the dummy leads are insulated respectively from the touch electrodes and the leads; a third grid-like structure is formed between adjacent dummy leads, a second disconnection line is arranged between the adjacent dummy leads in the third grid-like structure; and the second disconnection line has a substantially same shape as the first disconnection line.

In some embodiments, the first disconnection line between the adjacent leads in the first grid-like structure is a first straight line; the second disconnection line between the adjacent dummy leads in the third grid-like structure is a third straight line; and an extension direction of the third straight line is substantially parallel to an extension of the first straight line.

In some embodiments, the first disconnection line between the adjacent leads in the first grid-like structure is a first fold line, the second disconnection line between the adjacent dummy leads in the third grid-like structure is a third fold line, and the third fold line and the first fold line have a substantially same shape.

In some embodiments, a shape of each touch electrode is a block electrode arranged independently, a plurality of sawtooth structures are arranged at an edge of each touch electrode, and the adjacent touch electrodes are meshed with each other.

In some embodiments, material of the conductive layer is metal.

Correspondingly, an embodiment of the disclosure further provides a display panel, including the above-mentioned touch substrate provided by embodiments of the disclosure.

Correspondingly, an embodiment of the disclosure further provides a touch display device, including the above-mentioned display panel provided by embodiments of the disclosure.

DETAILED DESCRIPTION OF THE EMBODIMENTS

Figure 1:
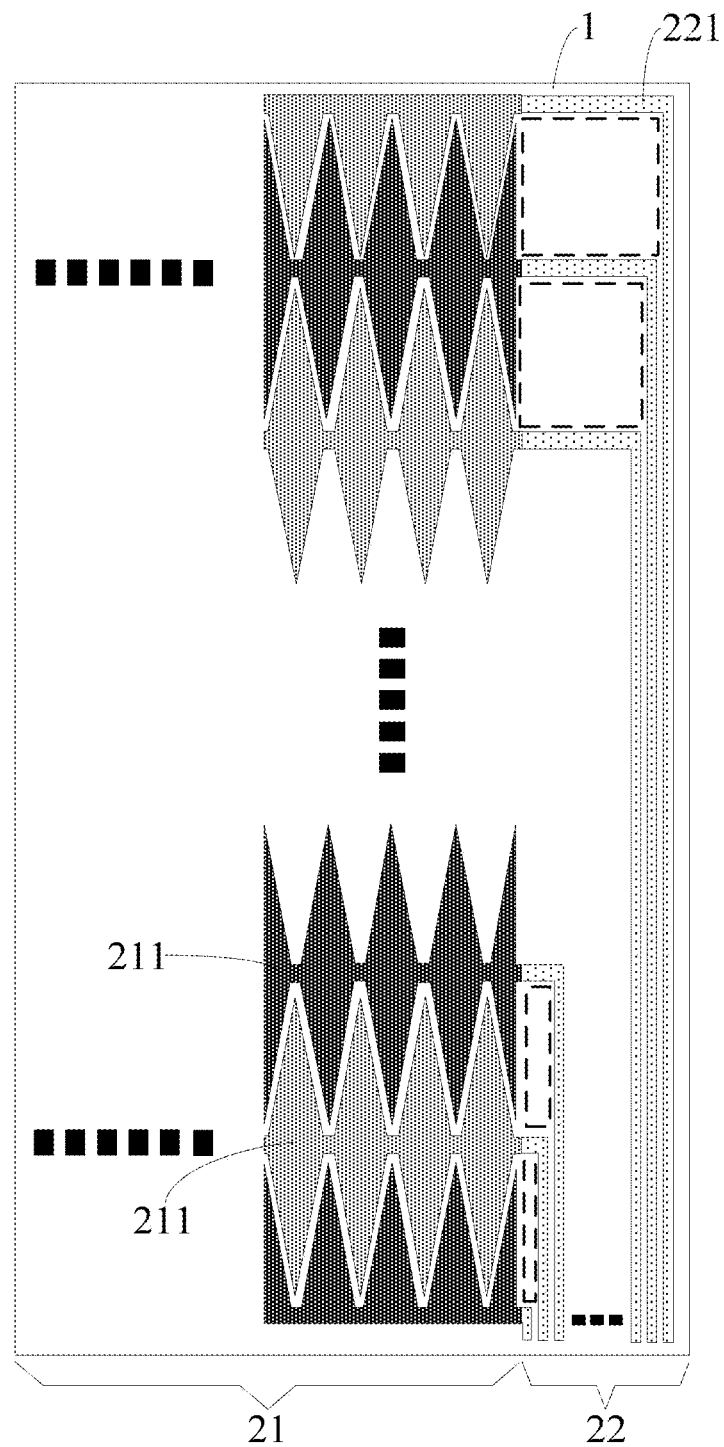
FIG. 1 is a top-view structural schematic diagram of a touch substrate according to an embodiment of the disclosure.

In order to make the objects, technical solutions and advantages of the disclosure clearer, specific embodiments of the touch control substrate and fabrication method thereof, the display panel and the display device provided by the embodiments of the disclosure will be illustrated below in details with reference to the drawings.

The thickness and shape of each layer of film in the drawings do not reflect the real scale of the touch substrate, but are only partial structures of the touch substrate, and are merely for purpose of schematically illustrating the content of the disclosure.

In recent years, with the advancement of smart display technology, the OLED display has become one of the hot spots in the display research field today. With the thinning of the display panel, the display panel and the touch are more and more closely integrated. In order to reduce the cost and increase the production capacity, the single-layer touch display panel has become a new research direction. Compared with the double-layer bridge sensor, the single-layer sensor has a great cost advantage because two masks are reduced in the process. However, with the close integration of the display panel and the touch, there are still some display problems. In a single-layer touch substrate, the block-shaped touch electrodes in the AA area generally adopt a metal grid-like structure, and the leads in the lead area of the AA area of the same layer also form a metal grid-like structure as a whole. The current metal grid of the touch electrodes is continuous and has no breakpoint, while the connection line at the breakline between adjacent leads is straight, resulting in the phenomenon that shadows can be seen visually due to inconsistent patterns of the touch electrodes and leads. Visually, the touch electrodes and leads have different reflections, causing shadows in the lead area visually, and resulting in the poor visibility.

In view of this, an embodiment of the disclosure provides a touch substrate, as shown in FIG. 1, which includes a touch area. FIG. 1 only shows the touch area, which includes a conductive layer on a base substrate 1, and the conductive layer is a single-layer structure. The conductive layer may include an electrode area 21 and a lead area 22, each of which may be one or more. The electrode area 21 includes a plurality of touch electrodes 211 (only a part of the touch electrodes 211 are shown in FIG. 1), and the lead area 22 includes a plurality of leads 221 electrically connected with the touch electrodes 211.

Figure 2:
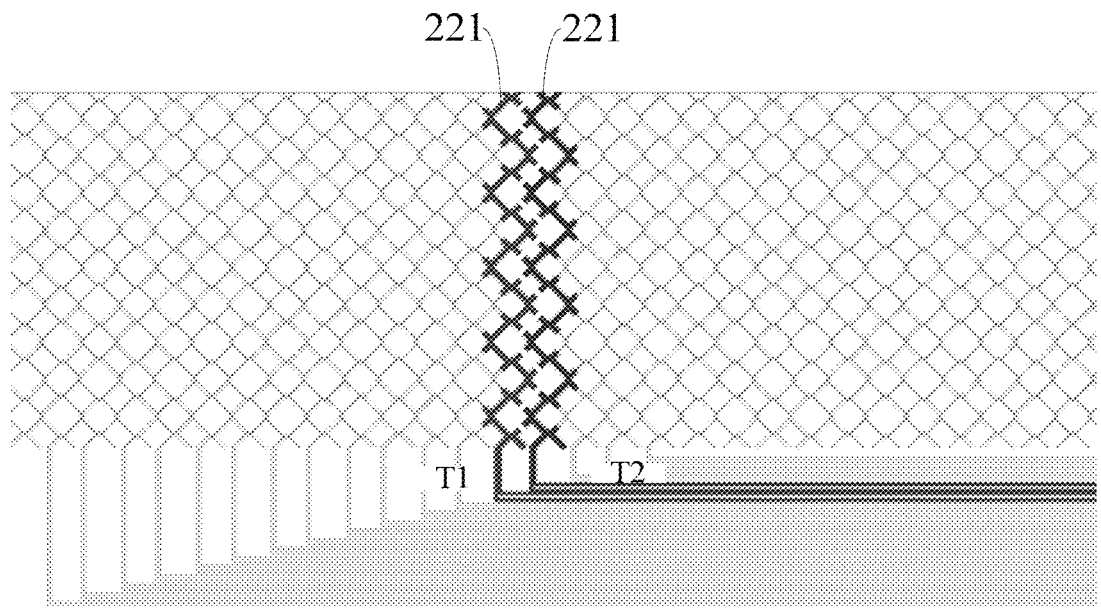
FIG. 2 is another top-view structural schematic diagram of a touch substrate according to an embodiment of the disclosure.

In the same lead area 22, a first grid-like structure is formed between adjacent leads 221. As shown in FIG. 2, a plurality of independent leads 221 as a whole form the first grid-like structure, and there is a first disconnection line between adjacent leads in the first grid-like structure. The trace lines such as T1 and T2 under the lead 221 in FIG. 2 represent the lines located in the non-touch area, which are used to electrically connect the leads in the touch area to the chip in the non-touch area.

Figure 3:
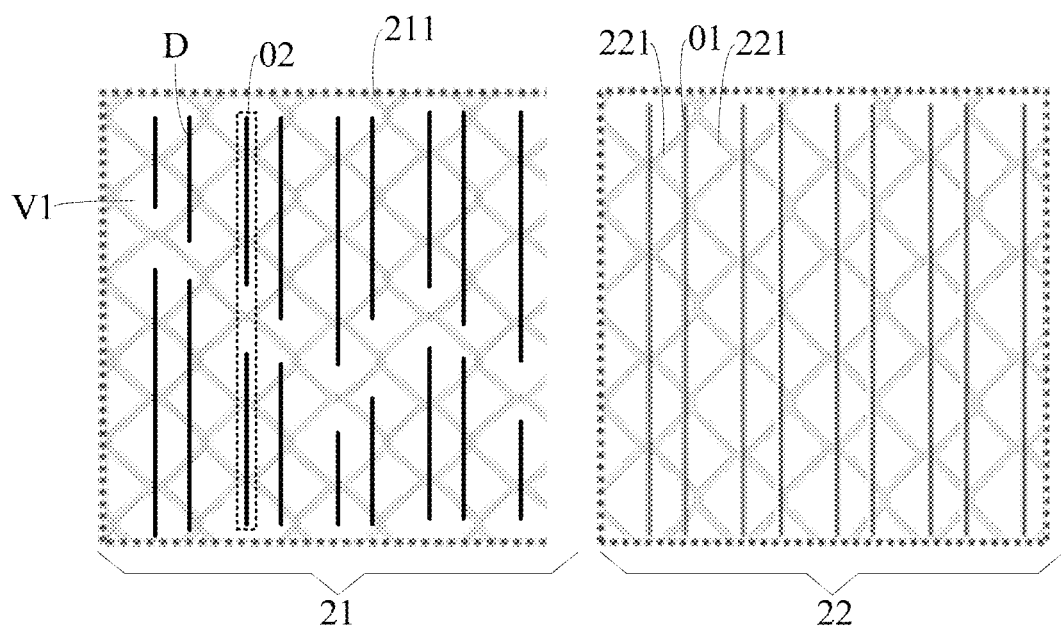
FIG. 3 is another top-view structural schematic diagram of a touch substrate according to an embodiment of the disclosure.
Figure 4:
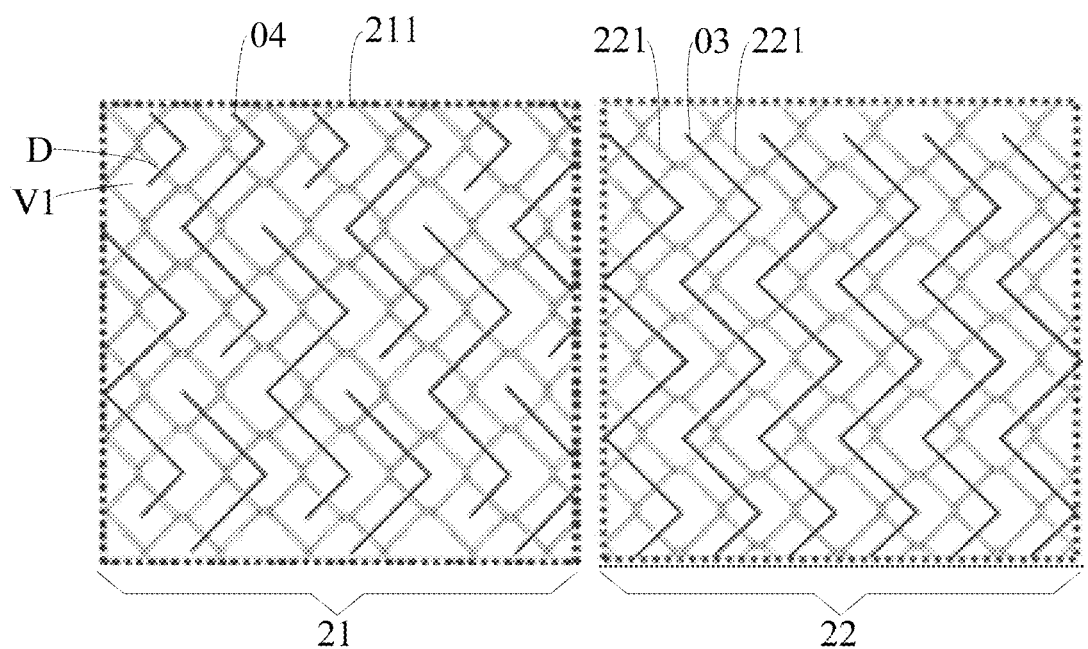
FIG. 4 is another top-view structural schematic diagram of a touch substrate according to an embodiment of the disclosure.

As shown in FIG. 3 and FIG. 4, the left parts in FIG. 3 and FIG. 4 are partially-enlarged structural schematic diagrams of the block-shaped touch electrodes 211 in the electrode area 21. The touch electrodes 211 have a second grid-like structure including a plurality of breakpoints D, and the connection line between the breakpoints D has the substantially same shape as the first disconnection line in the lead area 22 (the right parts in FIG. 3 and FIG. 4 are partially-enlarged structural schematic diagrams of the plurality of leads 221 in the lead area 22). The specific structures of FIG. 3 and FIG. 4 will be introduced in detail hereafter. It should be noted that "substantially same" means identical or similar in the disclosure.

The touch substrate provided by embodiments of the disclosure adopts a single-layer touch design, which can reduce the manufacturing process and decrease the module thickness; and furthermore, all leads form the first grid-like structure in the same lead area, the touch electrodes have the second grid-like structure that includes a plurality of breakpoints, and the connection line between breakpoints has the same or similar shape as/to the first disconnection line between adjacent leads in the lead area, so that the touch electrodes and the leads can be broken consistently, that is, the pattern of the touch electrodes and the pattern of the lead area can be identical or similar in whole, and thus the touch electrodes reflect light like the leads, and the phenomenon of shadows cannot be seen visually, thereby eliminating shadows visually and improving the visibility.

It should be noted that, in some embodiments, the mesh cells of the first grid-like structure and the mesh cells of the second grid-like structure are the same in size in the embodiment of the disclosure, and the wiring constituting the first grid-like structure and the wiring constituting the second grid-like structure have the same route and the same line width.

In some embodiments, as shown in FIG. 3, in the lead area 22 of FIG. 3, the first disconnection line between two adjacent leads 221 is a first straight line 01, and the leads 221 on both sides of the first straight line 01 are independent of each other. In the electrode area 21 of FIG. 3, the connection line between breakpoints D in the second grid-like structure is a second straight line 02, and the extending directions of the first straight line 01 and the second straight line 02 are substantially parallel. Since the first disconnection line between two adjacent leads 221 is the first straight line 01, the second straight line 02 is parallel to the first straight line 01 by setting a plurality of breakpoints D with the connection line being the second straight line 02 in the touch electrodes 211 in the shape of the second grid-like structure in the disclosure, so that the shape of the connection line of the breakpoints D can be the same as or similar to the shape of the first disconnection line between adjacent leads 221 in the lead area 22, and thus the touch electrodes 211 and the leads 221 can be broken consistently, that is, the pattern of the touch electrodes 211 and the pattern of the lead area 22 can be identical or similar in whole, thereby eliminating shadows visually and improving the visibility.

In some embodiments, as shown in FIG. 3, in the electrode area 21 of FIG. 3, the second grid-like structure has a plurality of second straight lines 02, and the pattern of the touch electrodes 211 between two adjacent second straight lines 02 is the same as or similar to the pattern of the leads 221 between two adjacent first straight lines 01. For example, the pattern of the touch electrodes 211 between the $1^{st}$ and $2^{nd}$ second straight lines 02 from the left in the electrode area 21 is the same as or similar to the pattern of the leads 221 between the 1 St and $2^{nd}$ first straight lines 01 from the left in the lead area 22 in FIG. 3; for example, the pattern of the touch electrodes 211 between the $2^{nd}$ and $3^{rd}$ second straight lines 02 from the left in the electrode area 21 is the same as or similar to the pattern of the leads 221 between the $2^{nd}$ and $3^{rd}$ first straight lines 01 from the left in the lead area 22 in FIG. 3, and so on. In this way, the patterns of the electrode area 21 and the lead area 22 can be substantially the same as a whole, so that the shadows can be completely eliminated visually, further improving the visibility.

In some embodiments, in order to reach the optimal state of the visibility, in the above-mentioned touch substrate provided by the embodiment of the disclosure, as shown in FIG. 3, there may be an one-to-one correspondence between the second straight lines 02 and the first straight lines 01. For example, the 1 St second straight line 02 from the left in the electrode area 21 corresponds to the 1 St first straight line 01 from the left in the lead area 22 in FIG. 3, the $2^{nd}$ second straight line 02 from the left in the electrode area 21 corresponds to the $2^{nd}$ first straight line 01 from the left in the lead area 22 in FIG. 3, the $3^{rd}$ second straight line 02 from the left in the electrode area 21 corresponds to the $3^{rd}$ first straight line 01 from the left in the lead area 22 in FIG. 3, and so on. Only a part of the touch electrodes 211 and leads 221 are shown in the disclosure.

In some embodiments, as shown in FIG. 3, the second grid-like structure has a plurality of mesh cells, each column of mesh cells have at least one first mesh cell V1, each first mesh cell V1 has at most one breakpoint D, all the first meshes V1 are electrically connected, and a connection line between breakpoints D on each column of mesh cells is a second straight line 02. Each column of mesh cells includes at least one first mesh cell V1 in which at most one breakpoint D is set, so that it can be ensured that each column of mesh cells will not be completely disconnected in every touch electrode, thus ensuring that each touch electrode 211 is a complete electrode electrically connected by each grid wiring. Assuming that each mesh cell in each column of mesh cells have two breakpoints D, the touch electrodes 211 may be split into a plurality of separate parts. Then, the parts electrically connected to the leads 221 among the plurality of parts are touch electrodes, and the remaining parts that are not electrically connected to the leads 221 become floating electrodes, influencing the touch performance. Therefore, each column of mesh cells have at least one first mesh cell V1, and each first mesh cell V1 has at most one breakpoint D.

In some embodiments, as shown in FIG. 4, in the lead area 22 of FIG. 4, the first disconnection line between two adjacent leads 221 is a first fold line 03, and the leads 221 on both sides of the first fold line 03 are independent of each other. In the electrode area 21 of FIG. 4, the connection line between breakpoints D in the second grid-like structure is a second fold line 04, and the shapes of the first fold line 03 and the second fold line 04 are the same or similar. Since the first disconnection line between two adjacent leads 221 is the first fold line 03, the shapes of the second fold line 04 and the first fold line 03 are the same or similar by setting a plurality of breakpoints D with the connection line being the second fold line 04 in the touch electrodes 211 in the shape of the second grid-like structure in the disclosure, so that the shape of the connection line of the breakpoints D can be the same as or similar to the shape of the first disconnection line between adjacent leads 221 in the lead area 22, and thus the touch electrodes 211 and the leads 221 can also be broken consistently, that is, the pattern of the touch electrodes 211 and the pattern of the lead area 22 can be identical or similar in whole, thereby eliminating shadows visually and improving the visibility.

In some embodiments, as shown in FIG. 4, in the electrode area 21 of FIG. 4, the second grid-like structure has a plurality of second fold lines 04, and the pattern of the touch electrodes 211 between two adjacent second fold lines 04 is the same as or similar to the pattern of the leads 221 between two adjacent first fold lines 03. For example, the pattern of the touch electrodes 211 between the $1^{st}$ and $2^{nd}$ second fold lines 04 from the left in the electrode area 21 is the same as or similar to the pattern of the leads 221 between the $1^{st}$ and $2^{nd}$ first fold lines 03 from the left in the lead area 22 in FIG. 4; for example, the pattern of the touch electrodes 211 between the $2^{nd}$ and $3^{rd}$ second fold lines 04 from the left in the electrode area 21 is the same as or similar to the pattern of the leads 221 between the $2^{nd}$ and $3^{rd}$ first fold lines 03 from the left in the lead area 22 in FIG. 4, and so on. In this way, the patterns of the electrode area 21 and the lead area 22 can also be substantially the same as a whole, so that the shadows can be completely eliminated visually, further improving the visibility.

In some embodiments, in order to reach the optimal state of the visibility, in the above-mentioned touch substrate provided by the embodiment of the disclosure, as shown in FIG. 4, there may be an one-to-one correspondence between the second fold lines 04 and the first fold lines 03. For example, the $1^{st}$ second fold line 04 from the left in the electrode area 21 corresponds to the $1^{st}$ first fold line 03 from the left in the lead area 22 in FIG. 4, the $2^{nd}$ second fold line 04 from the left in the electrode area 21 corresponds to the $2^{nd}$ first fold line 03 from the left in the lead area 22 in FIG. 4, the $3^{rd}$ second fold line 04 from the left in the electrode area 21 corresponds to the $3^{rd}$ first fold line 03 from the left in the lead area 22 in FIG. 4, and so on. Only a part of the touch electrodes 211 and leads 221 are shown in the disclosure.

In some embodiments, as shown in FIG. 4, the second grid-like structure has a plurality of mesh cells, each column of mesh cells have at least one first mesh cell V1, each first mesh cell V1 has at most one breakpoint D, all the first meshes V1 are electrically connected, and a connection line between breakpoints D on each column of mesh cells is a second fold line 04. Each column of mesh cells includes at least one first mesh cell V1 in which at most one breakpoint D is set, so that it can be ensured that each column of mesh cells will not be completely disconnected in every touch electrode, thus ensuring that each touch electrode 211 is a complete electrode electrically connected by each grid wiring. Assuming that each mesh cell in each column of mesh cells have two breakpoints D, the touch electrodes 211 may be split into a plurality of separate parts. Then, the parts electrically connected to the leads 221 among the plurality of parts are touch electrodes, and the remaining parts that are not electrically connected to the leads 221 become floating electrodes, influencing the touch performance. Therefore, each column of mesh cells have at least one first mesh cell V1, and each first mesh cell V1 has at most one breakpoint D.

Figure 5:
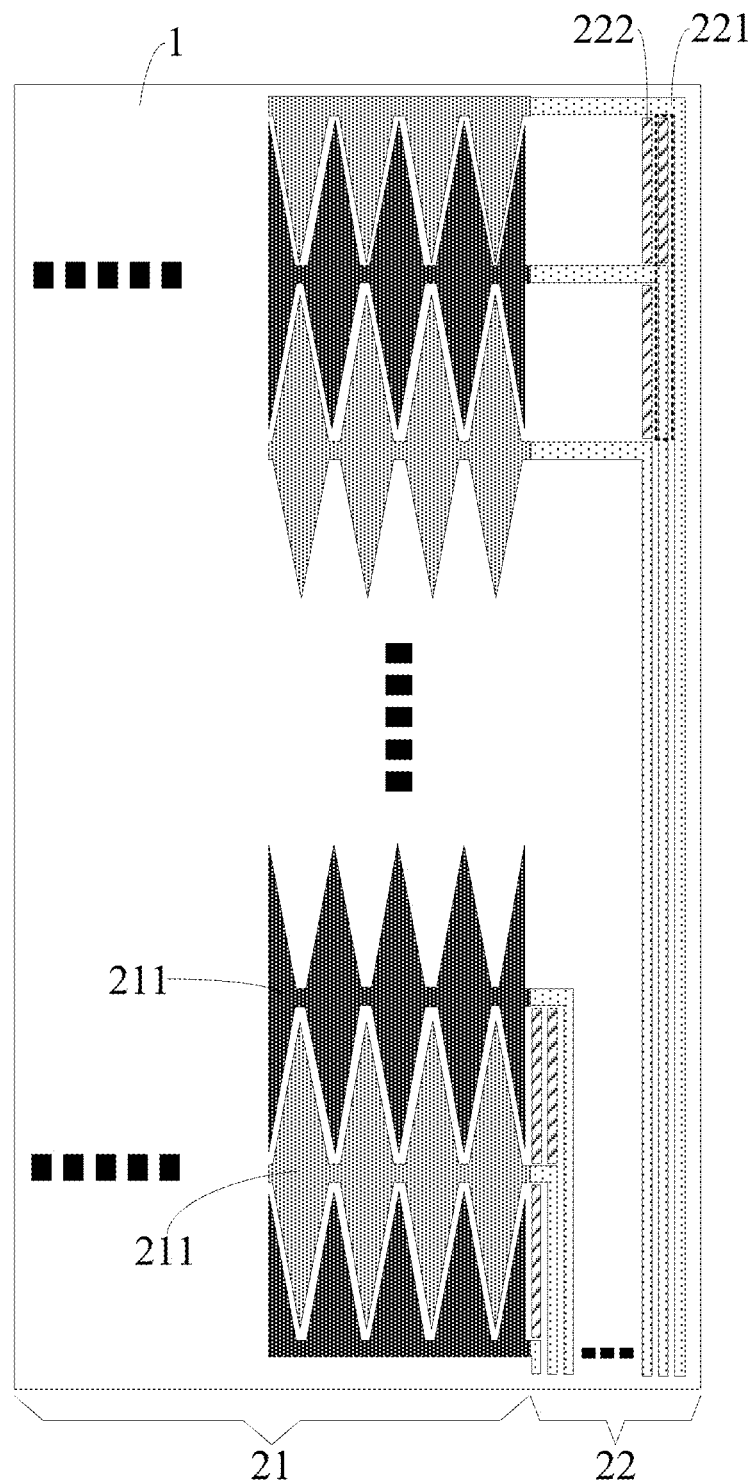
FIG. 5 is another top-view structural schematic diagram of a touch substrate according to an embodiment of the disclosure.
Figure 6:
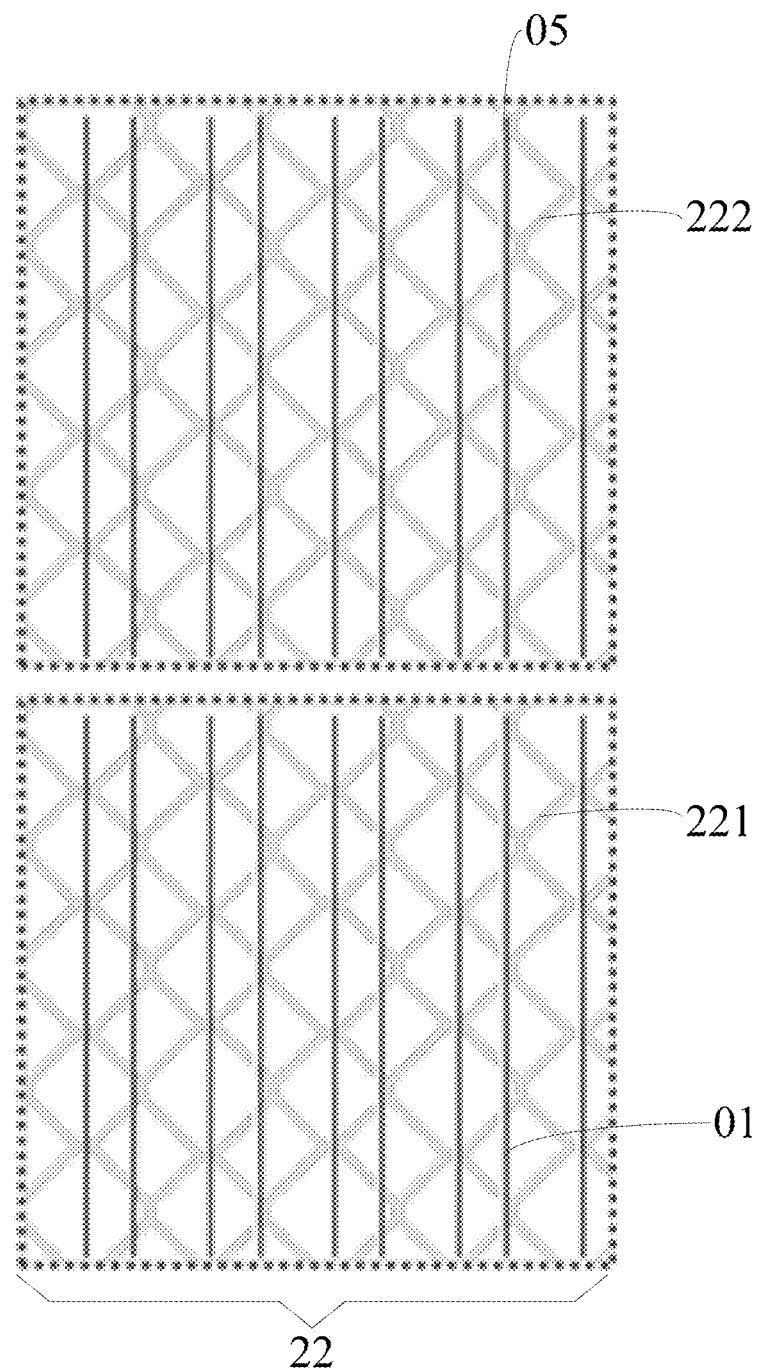
FIG. 6 is another top-view structural schematic diagram of a touch substrate according to an embodiment of the disclosure.
Figure 7:
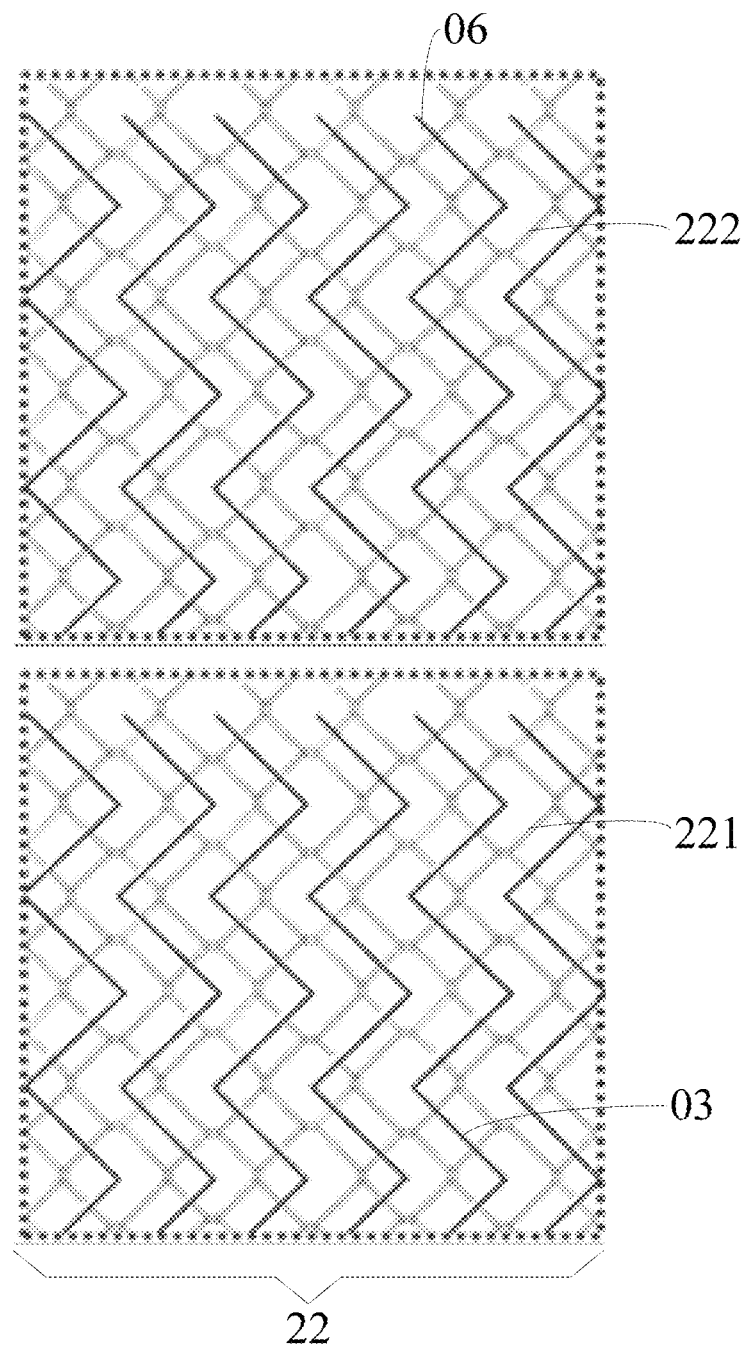
FIG. 7 is another top-view structural schematic diagram of a touch substrate according to an embodiment of the disclosure.

In some embodiments, as shown in FIG. 1, the shape of each touch electrode 211 is a block electrode arranged independently. In order to increase the coupling area between adjacent touch electrodes 211 and improve the touch sensitivity, a plurality of sawtooth structures are arranged at the edge of each touch electrode 211, and the adjacent touch electrodes 211 are meshed with each other. Each column has several touch electrodes 211 and corresponding leads 221. Since the leads 221 are generally composed of two parts extending along the row direction and the column direction, there is a gap (an area with dotted line frame) between the parts extending in the row direction in two leads 221 electrically connected to two adjacent touch electrodes 211 in the column direction. In order to further completely eliminate shadows visually and further improve the visibility, in the above-mentioned touch substrate provided by the embodiment of the disclosure, as shown in FIG. 5, the lead area 22 may further include a plurality of dummy leads 222 located at the gaps between the leads 221, where the dummy leads 222 are arranged insulating from the touch electrodes 211 and the leads 221, respectively. As shown in FIG. 6 and FIG. 7, which respectively illustrate schematic diagrams of the enlarged structure in the dotted line frame in FIG. 5, a third grid-like structure is formed between adjacent dummy leads 222, there is a second disconnection line between adjacent dummy leads 222 in the third grid-like structure, and the shape of the second disconnection line between adjacent dummy leads 222 is the same as or similar to that of the connection line between breakpoints D in the second grid-like structure, that is, the shape of the second disconnection line is the same as or similar to that of the first disconnection line. Thus, the patterns of all regions in the entire touch area are the same or similar, and the shadows can be completely eliminated visually, further improving the visibility.

In some embodiments, in order to ensure that the patterns of the lead area and the electrode area are the same or similar, in the above-mentioned touch substrate provided by the embodiment of the disclosure, as shown in FIG. 6, the second disconnection line between two adjacent dummy leads 222 may be a third straight line 05, and the third straight line 05 and the first straight line 01 may have substantially parallel extending directions and be on the same straight line.

Similarly, in some embodiments, in order to ensure that the patterns of the lead area and the electrode area are the same or similar, in the above-mentioned touch substrate provided by the embodiment of the disclosure, as shown in FIG. 7, the second disconnection line between two adjacent dummy leads 222 may also be a third fold line 06, which may have the substantially same shape as the first fold line 03, and they may be considered to be on the same extended fold line.

In some embodiments, the metal or ITO material may be used to fabricate the touch electrodes of the conductive layer. Compared with the ITO material, the metal materials have the advantages of better ductility, less breakage and low resistance, and thus can improve the bending performance of the touch substrates, so that the touch substrates are more suitable for realizing the flexible touch function, and the touch performance is better. Therefore, in some embodiments, in the above-mentioned touch substrate provided by the embodiment of the disclosure, the material of the conductive layer is preferably metal.

Figure 8:
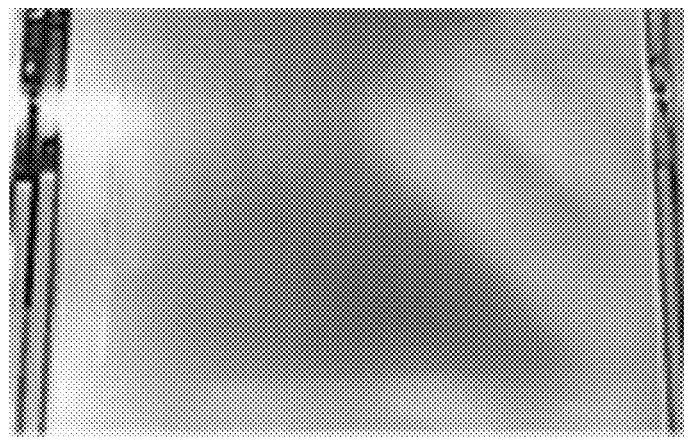
FIG. 8 is a picture image when no breakpoint is set in the touch electrode.
Figure 9:
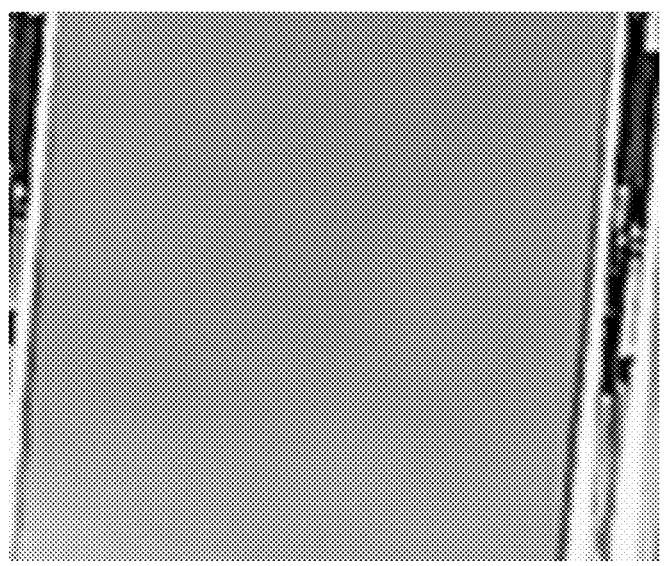
FIG. 9 is a picture image when breakpoints are set in the touch electrode.

The inventors of the disclosure have conducted experiments on setting no breakpoint and setting breakpoints in the touch electrodes, as shown in FIG. 8 and FIG. 9. FIG. 8 is an effect picture of the user's view when no breakpoint is set in the touch electrodes, where it can be seen that there is a shadow phenomenon on the picture, causing the picture to be not uniform and affecting the user experience; FIG. 9 is an effect picture of the user's view when breakpoints are set in the touch electrodes, where it can be seen that the picture is well uniform and there is no shadow phenomenon, thus improving the user experience.

It should be noted that the above-mentioned embodiments of the disclosure only represent some embodiments of the disclosure, and the descriptions thereof are relatively specific and detailed, that is, FIG. 3, FIG. 4, FIG. 6 and FIG. 7 of the embodiments of the disclosure list two disconnection modes, but cannot be construed as limitations on the patent scope of the disclosure. It should be noted that several modifications and improvements can be made without departing from the concept of the disclosure, and all of them belong to the protection scope of the disclosure as long as it can be ensured that the electrode area and the lead area are broken consistently.

Of course, in some embodiments, the touch substrate further includes other film layers well known to those skilled in the art, which are not listed here. The disclosure merely schematically illustrates that the conductive layer of the touch substrate in the disclosure is a single layer, and how to design the disconnection modes of the touch electrodes and the leads to eliminate shadows and improve the visibility.

It should be noted that, in the above-mentioned touch substrate provided by embodiments of the disclosure, the touch electrodes and the leads may be formed by a patterning process, which may only include the photolithography process or may include the photolithography process and an etching step, and may also include other processes for forming predetermined patterns such as printing and inkjet; the photolithography process refers to the process of forming patterns using photoresist, mask plate, exposure machine, etc., including film formation, exposure, development and other processes. In some embodiments, the corresponding patterning process may be selected according to the structure formed in the disclosure.

Based on the same inventive concept, an embodiment of the disclosure further provides a display panel, including the above-mentioned touch substrate provided by the embodiments of the disclosure. The principle of the display panel to solve the problem is similar to that of the above-mentioned touch substrate, so the implementations of the display panel can refer to the implementations of the above-mentioned touch substrate, and the detailed description thereof will be omitted here.

Based on the same inventive concept, an embodiment of the disclosure further provides a display device, including the above-mentioned organic light-emitting display panel provided by the embodiment of the disclosure. The display device may be: a mobile phone, a tablet, a television, a display, a laptop, a digital photo frame, a navigator, or any other product or component with display function. The principle of the display device to solve the problem is similar to that of the above-mentioned touch substrate, so the implementations of the display device can refer to the implementations of the above-mentioned touch substrate, and the detailed description thereof will be omitted here.

In the touch substrate, the display panel and the touch display device provided by embodiments of the disclosure, the touch substrate of the disclosure adopts a single-layer touch design, which can reduce the manufacturing process and decrease the module thickness; and furthermore, all leads form the first grid-like structure in the same lead area, the touch electrodes have the second grid-like structure that includes a plurality of breakpoints, and the connection line between breakpoints has the same or similar shape as/to the first disconnection line between adjacent leads in the lead area, so that the touch electrodes and the leads can be broken consistently, that is, the pattern of the touch electrodes and the pattern of the lead area can be identical or similar in whole, and thus the touch electrodes reflect light like the leads, and the phenomenon of shadows cannot be seen visually, thereby eliminating shadows visually and improving the visibility.

Evidently those skilled in the art can make various modifications and variations to the disclosure without departing from the spirit and scope of the disclosure. Thus the disclosure is also intended to encompass these modifications and variations to the disclosure as long as these modifications and variations come into the scope of the claims of the disclosure and their equivalents.

What is claimed is:

1. A touch substrate, comprising:
   a base substrate;
   a conductive layer on the base substrate, the conductive layer being a single-layer structure, and the conductive layer comprising a plurality of touch electrodes and a plurality of leads electrically connected with the plurality of touch electrodes; wherein:
   a first grid-like structure is formed between adjacent leads, and a first disconnection line is arranged between the adjacent leads in the first grid-like structure;
   the touch electrodes have a second grid-like structure, and the second grid-like structure comprises a plurality of breakpoints; and
   a connection line between the plurality of breakpoints has a substantially same shape as the first disconnection line;
   wherein the first disconnection line between the adjacent leads in the first grid-like structure is a first fold line;
   the connection line between the breakpoints in the second grid-like structure is a second fold line; and
   the first fold line and the second fold line have a substantially same shape.

2. The touch substrate of claim 1, wherein the second grid-like structure has a plurality of second fold lines; and
   a touch electrode between two adjacent second fold lines has a substantially same pattern as a lead between two adjacent first fold lines.

3. The touch substrate of claim 2, wherein the second grid-like structure has a plurality of mesh cells, each column of mesh cells have at least one first mesh cell, and each of the at least one first mesh cell has at most one breakpoint; and
   all first mesh cells are electrically connected, and a connection line between breakpoints of each column of mesh cells is the second fold line.

4. The touch substrate of claim 1, wherein the conductive layer further comprises a plurality of dummy leads located at gaps between the leads;
   the dummy leads are insulated respectively from the touch electrodes and the leads;
   a third grid-like structure is formed between adjacent dummy leads, a second disconnection line is arranged between the adjacent dummy leads in the third grid-like structure; and
   the second disconnection line has a substantially same shape as the first disconnection line.

5. The touch substrate of claim 4, wherein the first disconnection line between the adjacent leads in the first grid-like structure is a first straight line;
   the second disconnection line between the adjacent dummy leads in the third grid-like structure is a third straight line; and
   an extension direction of the third straight line is substantially parallel to an extension of the first straight line.

6. The touch substrate of claim 4, wherein the first disconnection line between the adjacent leads in the first grid-like structure is a first fold line;
   the second disconnection line between the adjacent dummy leads in the third grid-like structure is a third fold line; and
   the third fold line and the first fold line have a substantially same shape.

7. The touch substrate of claim 1, wherein a shape of each touch electrode is a block electrode arranged independently;
   a plurality of sawtooth structures are arranged at an edge of each touch electrode; and
   adjacent touch electrodes are meshed with each other.

8. The touch substrate of claim 1, wherein a material of the conductive layer is metal.

9. A display panel, comprising the touch substrate of claim 1.

10. A touch display device, comprising the display panel of claim 9.

11. A touch substrate, comprising:
    a base substrate;
    a conductive layer on the base substrate, the conductive layer being a single-layer structure, and the conductive layer comprising a plurality of touch electrodes and a plurality of leads electrically connected with the plurality of touch electrodes; wherein:
    a first grid-like structure is formed between adjacent leads, and a first disconnection line is arranged between the adjacent leads in the first grid-like structure;
    the touch electrodes have a second grid-like structure, and the second grid-like structure comprises a plurality of breakpoints; and
    a connection line between the plurality of breakpoints has a substantially same shape as the first disconnection line;
    wherein the first disconnection line between the adjacent leads in the first grid-like structure is a first straight line;
    the connection line between the breakpoints in the second grid-like structure is a second straight line; and
    an extension direction of the first straight line is substantially parallel to an extension direction of the second straight line.

12. The touch substrate of claim 11, wherein the second grid-like structure has a plurality of second straight lines; and
    a touch electrode between two adjacent second straight lines has a substantially same pattern as a lead between two adjacent first straight lines.

13. The touch substrate of claim 12, wherein the second grid-like structure has a plurality of mesh cells, each column of mesh cells have at least one first mesh cell, and each of at least one first mesh cell has at most one breakpoint; and all first mesh cells are electrically connected, and a connection line between breakpoints of each column of mesh cells is the second straight line.

14. The touch substrate of claim 11, wherein the conductive layer further comprises a plurality of dummy leads located at gaps between the leads;

the dummy leads are insulated respectively from the touch electrodes and the leads;

a third grid-like structure is formed between adjacent dummy leads, a second disconnection line is arranged between the adjacent dummy leads in the third grid-like structure; and the second disconnection line has a substantially same shape as the first disconnection line.

15. The touch substrate of claim 14, wherein the first disconnection line between the adjacent leads in the first grid-like structure is a first straight line;

the second disconnection line between the adjacent dummy leads in the third grid-like structure is a third straight line; and an extension direction of the third straight line is substantially parallel to an extension of the first straight line.

16. The touch substrate of claim 14, wherein the first disconnection line between the adjacent leads in the first grid-like structure is a first fold line;

the second disconnection line between the adjacent dummy leads in the third grid-like structure is a third fold line; and the third fold line and the first fold line have a substantially same shape.

17. A touch substrate, comprising:

a base substrate;

a conductive layer on the base substrate, the conductive layer being a single-layer structure, and the conductive layer comprising a plurality of touch electrodes and a plurality of leads electrically connected with the plurality of touch electrodes; wherein:

a first grid-like structure is formed between adjacent leads, and a first disconnection line is arranged between the adjacent leads in the first grid-like structure;

the touch electrodes have a second grid-like structure, and the second grid-like structure comprises a plurality of breakpoints; and a connection line between the plurality of breakpoints has a substantially same shape as the first disconnection line;

wherein the conductive layer further comprises a plurality of dummy leads located at gaps between the leads;

the dummy leads are insulated respectively from the touch electrodes and the leads;

a third grid-like structure is formed between adjacent dummy leads, a second disconnection line is arranged between the adjacent dummy leads in the third grid-like structure; and the second disconnection line has a substantially same shape as the first disconnection line.

18. The touch substrate of claim 17, wherein the first disconnection line between the adjacent leads in the first grid-like structure is a first straight line;

the second disconnection line between the adjacent dummy leads in the third grid-like structure is a third straight line; and an extension direction of the third straight line is substantially parallel to an extension of the first straight line.

19. The touch substrate of claim 17, wherein the first disconnection line between the adjacent leads in the first grid-like structure is a first fold line;

the second disconnection line between the adjacent dummy leads in the third grid-like structure is a third fold line; and the third fold line and the first fold line have a substantially same shape.

20. The touch substrate of claim 17, wherein a shape of each touch electrode is a block electrode arranged independently;

a plurality of sawtooth structures are arranged at an edge of each touch electrode; and adjacent touch electrodes are meshed with each other.

\* \* \* \* \*